(12) United States Patent
Haygood

(10) Patent No.: US 6,761,160 B1
(45) Date of Patent: Jul. 13, 2004

(54) HOLLOW WALLED SOLID FUEL GRILL

(76) Inventor: Lawton Haygood, 28 Scenic Hwy., Rising Fawn, GA (US) 30738

( * ) Notice: Subject to any disclaimer, the term of this patent is extended or adjusted under 35 U.S.C. 154(b) by 0 days.

(21) Appl. No.: 09/859,257

(22) Filed: May 17, 2001

(51) Int. Cl.[7] .......................... F24C 15/08; F24C 15/00
(52) U.S. Cl. .................... 126/25 R; 126/25 B; 126/50; 126/77
(58) Field of Search ............................ 126/25 R, 15 A, 126/25 B, 77, 41 R, 50, 36; 110/157, 300, 298

(56) References Cited

U.S. PATENT DOCUMENTS

| | | | | |
|---|---|---|---|---|
| 3,771,510 A | * | 11/1973 | Short | 126/25 A |
| 3,938,494 A | * | 2/1976 | Clark | 126/41 R |
| 4,166,413 A | * | 9/1979 | Meszaros | 126/25 R |
| 4,508,097 A | * | 4/1985 | Berg | 126/21 R |
| 4,616,627 A | * | 10/1986 | Haygood | 126/77 |
| 4,690,125 A | * | 9/1987 | Beller | 126/1 F |
| 4,766,876 A | * | 8/1988 | Henry et al. | 126/77 |
| 4,773,386 A | * | 9/1988 | Archer | 210/244 |
| 4,813,397 A | * | 3/1989 | Yamada | 126/21 A |
| 4,827,903 A | * | 5/1989 | Kim | 126/299 D |
| 4,856,491 A | * | 8/1989 | Ferguson et al. | 126/77 |
| 4,884,554 A | * | 12/1989 | Yanagida | 126/21 R |
| 5,070,857 A | * | 12/1991 | Sarten | 126/25 A |
| 5,121,738 A | * | 6/1992 | Harris | 126/41 R |
| 5,163,359 A | * | 11/1992 | McLane, Sr. | 126/25 R |
| 5,469,836 A | * | 11/1995 | Greenall | 126/193 |
| 5,603,255 A | * | 2/1997 | Nouvelot et al. | 126/25 R |
| 5,657,742 A | * | 8/1997 | Greenall | 126/193 |
| 5,878,739 A | * | 3/1999 | Guidry | 126/25 R |
| 5,918,536 A | * | 7/1999 | Cheng | 126/25 R |
| 6,000,389 A | * | 12/1999 | Alpert | 126/25 R |
| 6,142,143 A | * | 11/2000 | Martin | 126/200 |
| 6,161,534 A | * | 12/2000 | Kronman | 126/41 R |
| 6,205,996 B1 | * | 3/2001 | Ryan | 126/41 R |
| 6,349,713 B1 | * | 2/2002 | Toyama | 126/25 R |
| 6,422,231 B1 | * | 7/2002 | Hamilton et al. | 126/304 R |

OTHER PUBLICATIONS

AZTEC brochure for Grill models R/T–36, ST–42, VR–3, and ST–66, 1997.
American Range, 1997.
Wood Stone—Single Split Rotisserie and Mt. Saint Helens Charbroiler, Jan. 1998.
Imperial Mesquite Wood Broilers brochure, 1997.
Nature–Glo Advertisement, 1997.

* cited by examiner

Primary Examiner—Henry Bennett
Assistant Examiner—Kathryn Odland
(74) Attorney, Agent, or Firm—Miller & Martin LLP

(57) ABSTRACT

A solid fuel cooking device incorporates a combustion chamber bound by an open upper side and an open lower side and is substantially closed on four sides by a retaining wall. The combustion chamber is covered from above by a cooking surface grate and below by a solid fuel support grate where the fuel support is disposed within the retaining wall below and parallel to the cooking surface grate. A housing is attached to the exterior of the retaining wall creating an air space between the housing and retaining wall. The cooking device uses a unique arrangement of gas jets to ignite the solid fuel where the gas jets are mounted horizontally within the retaining wall below the fuel support platform, injecting the lit gas beneath the solid fuel positioned upon the fuel support.

18 Claims, 4 Drawing Sheets

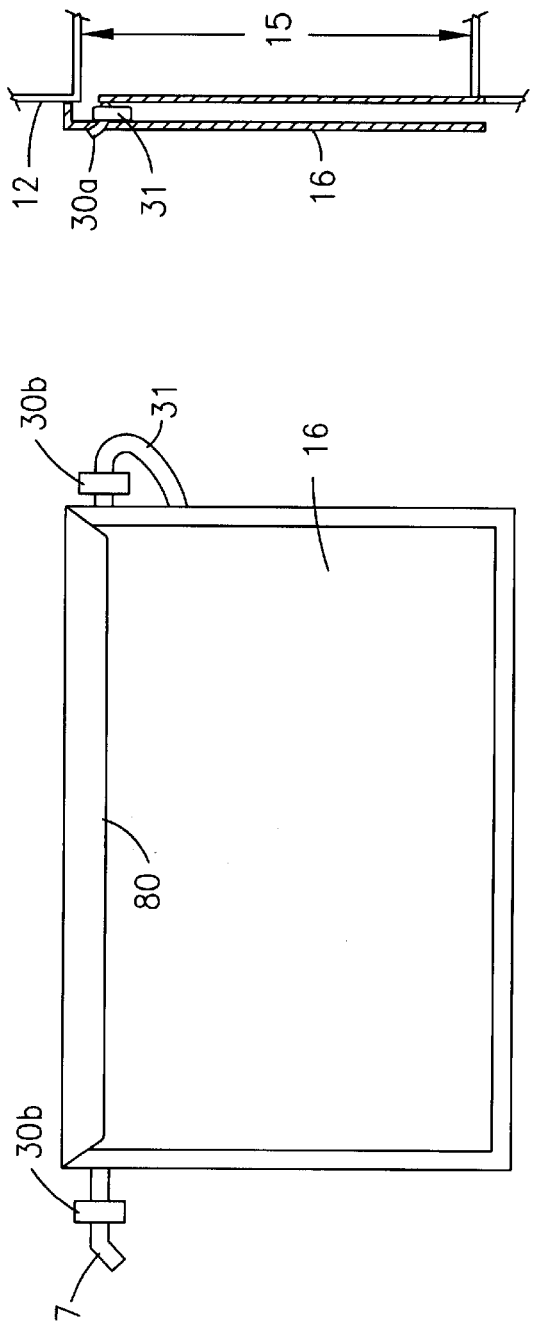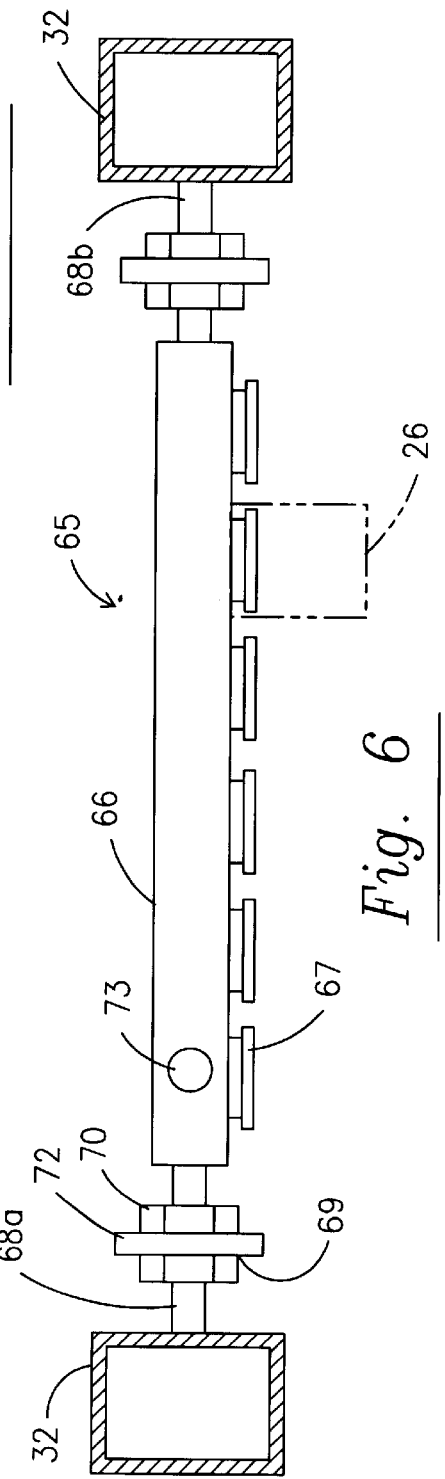

HOLLOW WALLED SOLID FUEL GRILL

FIELD OF THE INVENTION

This invention relates to a solid fuel cooking device, and more particularly to a hollow-walled solid-fuel-burning grill having improved means for starting, stopping, and maintaining the combustion of solid fuel within the combustion chamber, while keeping the exterior of the grill relatively cool.

BACKGROUND OF THE INVENTION

Prior solid-fuel-burning grills have utilized gas burner tubes as starters for logs with little success. The problems stem from the positioning of the burner tubes. Typically, these tubes have been placed centrally below the combustion chamber of the grill. Consequently, the openings in the tubes quickly become clogged with ash and drippings from the chamber and are thereafter abandoned as a method of igniting solid fuel. Without effective gas burner tubes it is common in the industry for cooks to ignite fuel either by a slower method such as the use of paper and kindling wood or by the use of various accelerants such as lighter fluid. The use of accelerants requires the cook to store the flammable material in the kitchen area where storage conditions are not ideal, and lead to various liability and insurance issues. Furthermore, cooks that rely on methods other than gas burner tubes for igniting the fuel are tempted to overbuild their fire so that they will not risk repeating the ignition process. Overbuilding leads to fuel waste and often requires the cook to douse the fuel with water to regulate the temperature of the overbuilt fire.

From a practical standpoint, previous solid-fuel-burning grill designs have suffered from the dual problem of inefficient fuel consumption and unwanted heat retention. Many current solid-fuel-burning grill designs have fire brick interiors where it is necessary to warm up the grill for approximately two hours before the grill heats evenly. Likewise, when the grill is no longer needed for cooking, a lengthy wait is necessary to cool the grill to a safe temperature to be left unattended. An additional drawback to these solid wall designs is that heat is conducted through the walls of the burning chamber and the exposed exterior of the grill is heated to unsafe temperatures during the course of the cooking period. Because the grill is imperceptibly hot cooks may be burned by touching the exterior of the grill, and the grill may not be placed adjacent to walls due to the potential fire hazard.

Finally, in commercial solid-fuel-burning stoves it is necessary to let the fire burn out at the end of the night and to leave a vented hood operating to blow the smoke from the restaurant. The fire brick interior walls of the stoves preclude completely dousing the fire with water. Burning out the fire requires someone to either remain at the restaurant to tend the fire or to leave the fire unattended overnight. Neither option is ideal, and again, places the owner/manager of the restaurant in the difficult situation of weighing convenience versus liability. In addition fuel is wasted in the burn-out process.

As such, a need exists for a solid-fuel-burning grill capable of being easily started by igniting gas jets, while also providing an efficient manner in which to terminate the cooking session. The present invention provides an efficient solid-fuel-burning grill, and keeps the exterior of the grill at a safe temperature.

SUMMARY OF THE INVENTION

It is, therefore, an object of the present invention to provide a solid-fuel cooking device including a combustion chamber bounded by an open upper side and being substantially closed on four lateral sides, the lateral combustion chamber sides being double walled. These double walled sides are constructed with open bottoms and air space that permits air to enter from the bottom and then as the air warms, to vent into the upper portions of the burning chamber. This continual flow of air within the double wall prevents the outer walls from overheating. In addition, in the lateral sides of the stove, not bearing a door, a third wall may be added in between the inner and outer walls to provide an even greater cooling/insulation effect.

It is also an object of the present invention to provide a solid-fuel cooking device having shielded natural-gas jets mounted horizontally on the interior of the combustion chamber for quick, safe, and efficient ignition of the solid-fuel.

It is a further object of the present invention to provide a solid-fuel cooking device having a timer connected to a solenoid to control the burn time of the natural-gas jets.

It is yet another object of the present invention to provide a solid-fuel cooking device with rotatable and removable combustion chamber doors to provide access to the combustion chamber and to permit easy cleaning.

It is still another object of the present invention to provide a solid-fuel cooking device that quickly reaches suitable cooking temperatures while using a minimum amount of fuel, and can be quickly extinguished to prevent the waste of fuel.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 5A is an isolated front view of a grill door and its associated hinge and hook apparatus.

FIG. 5B is a side view of the grill door and apparatus.

FIG. 6 is a view of the gas supply manifold in isolation.

DETAILED DESCRIPTION OF THE INVENTION

Figure 1:
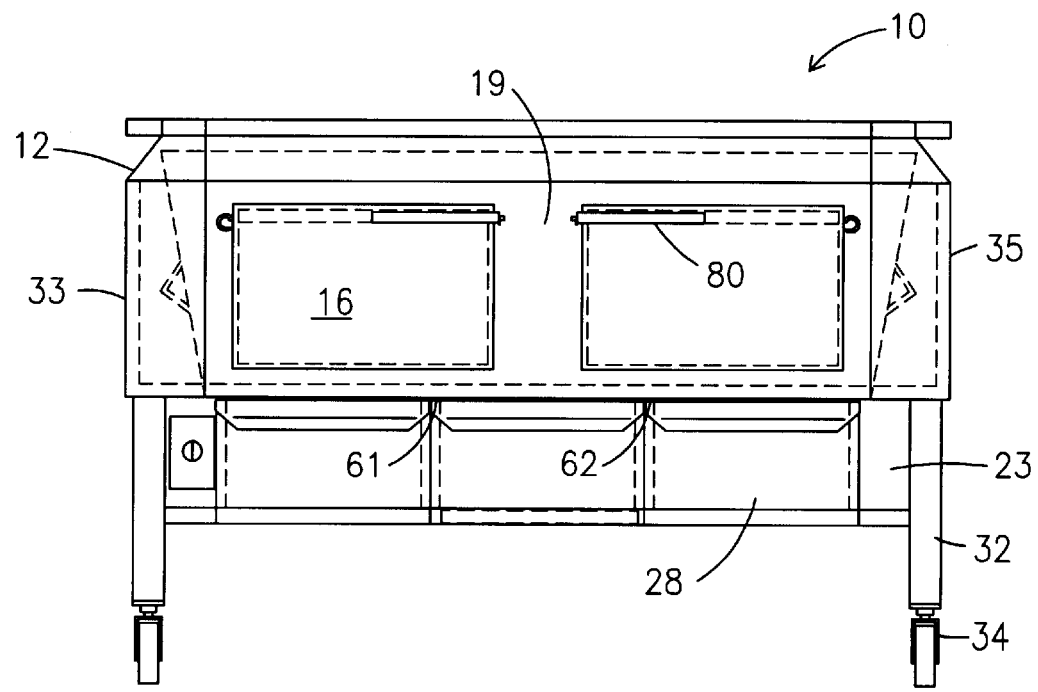
FIG. 1 is a front plan view of a grill according to the present invention showing some interior features in phantom.

Turning now to the drawings, and initially to FIG. 1 a solid fuel cooking device of the present invention is depicted in the form of grill 10. The grill 10 comprises a housing 12, which may be further subdivided into combustion chamber 19 and debris chamber 23. The housing 12 includes front doors 16 which provide access to a fuel support platform 18 (shown in FIG. 2) by pulling on handle 80. The front door 16 is best seen in FIG. 5a. The door 16 is removable and is attached to the housing 12 by a hook-hinge 30a and hanger 31. The hook-hinge 30a is attached to the exterior of the housing 12 slightly above the door opening 15 as shown in FIG. 5b. The hook-hinge 30a angles upward and allows the hanger 31, attached to one side of the front door 16, to rest on the hook-hinge 30a. A second hook hinge 30b holds latch 7. The latch 7 may be pulled up and off the hook-hinge 30b to pivot the door on hook-hinge 30a. The door may be completely removed from the housing 12 by pulling the latch 7 and the hanger 31 off the hook-hinges 30a and 30b. Once the door is removed the combustion chamber 19 may be accessed with ease.

Figure 2:
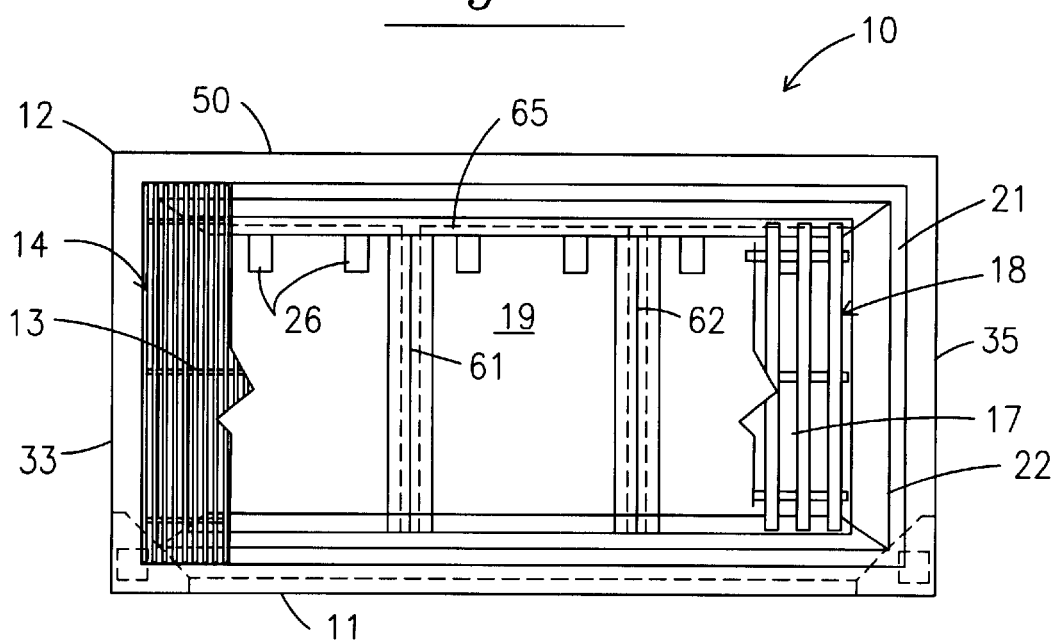
FIG. 2 is a top plan view of the grill of FIG. 1.

Referring to FIG. 2, the combustion chamber 19 is further defined by the fuel support platform 18 near the bottom of the grill 10, and parallel to the cooking surface 14 near the top, and from side walls 33 and 35 extending upward from the perimeter of the fuel support platform 18 to the cooking surface 14. Both fuel support platform 18 and cooking surface 14 are typically comprised of heavy metal grates.

Referring back to FIG. 1, the debris chamber 23 of grill 10 includes three collection trays 28 disposed immediately below the fuel support platform 18; however, any number of trays may be employed. The collection trays 28 function to collect both drippings from food placed upon the food cooking surface 14, and spent fuel, ash and cinders from the fuel support platform 18. A left gable 61 and right gable 62 are positioned above the adjacent sides of the three collection trays 28. As best seen in FIG. 2 the gables 61 and 62 are attached to the interior of the front wall 11 and back wall 50, below the fuel support platform 18. The gables 61 and 62 serve to direct the ash and drippings away from the space between the sides of the collection trays 28 so that the waste is captured in the easily removable trays 28. This design allows the grill 10 to have an open bottom allowing air to freely enter the combustion chamber 19 around the sides of the trays 28.

As shown in the drawings, the housing 12 is supported by four legs 32 having casters 34, which permits the grill 10 to be moved about as necessary. Additionally, the legs 32 may be adjustable to insure a horizontal elevation of the cooking surface 14, and to permit the height of the cooking surface 14 to be altered according to preference.

As best shown in FIG. 2 the grill 10 is conveniently built in a rectangular configuration with an upper cooking surface 14, on the top side of the cooking device. The cooking surface 14 comprises rectangular grate 13 adapted to support food to be cooked (meat, fish, fowl, vegetables, etc.) in the usual manner.

As with the cooking surface 14, the fuel support platform 18, at the bottom of combustion chamber 19 comprises grates 17 capable of supporting individual pieces of solid fuel, most typically hard wood logs. Grates 17 permit the flow of outside air from below the fuel support platform 18 up into the combustion chamber 19, and thence to the cooking surface 14. Both fuel support grates 17 and food cooking grates 13 are removably positioned relative to the housing 12 so that they may be easily removed for cleaning purposes, when desired.

Also illustrated in FIG. 2, are a plurality of gas jet housings 26. The gas jet housings 26 are disposed below the fuel support platform 18. These gas jet housings 26 may take the form of hollow pipes or tubes. The gas jet housings 26 are in communication with the burner manifold 65 and although six (6) gas jet housings 26 are shown, varying numbers of housings 26 may be used to good advantage in accordance with the size of the grill 10.

Figure 3:
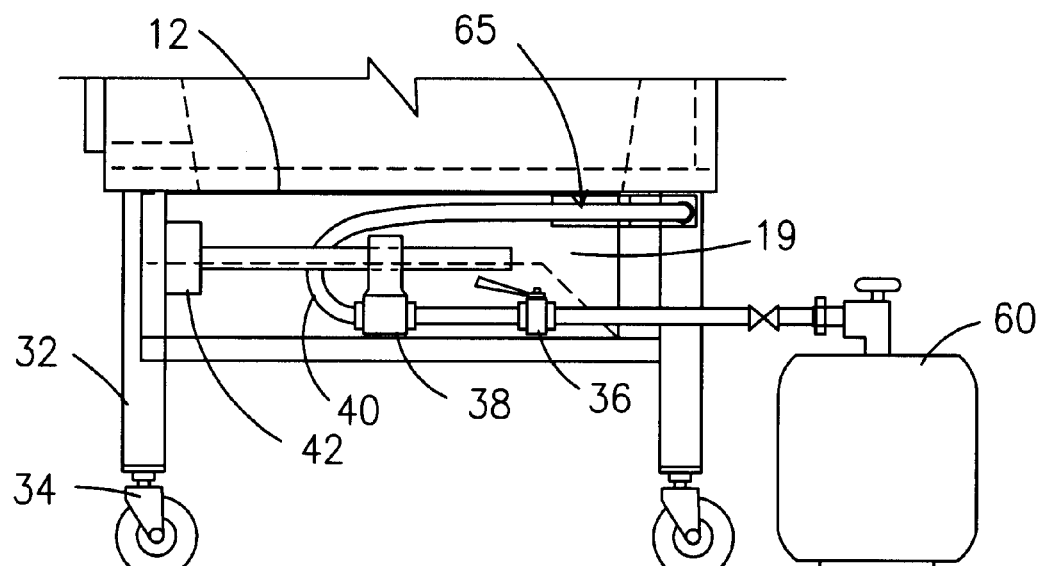
FIG. 3 is a side plan sectional view of the lower portion of the grill illustrating the location of the solenoid and gas cock.
Figure 7:
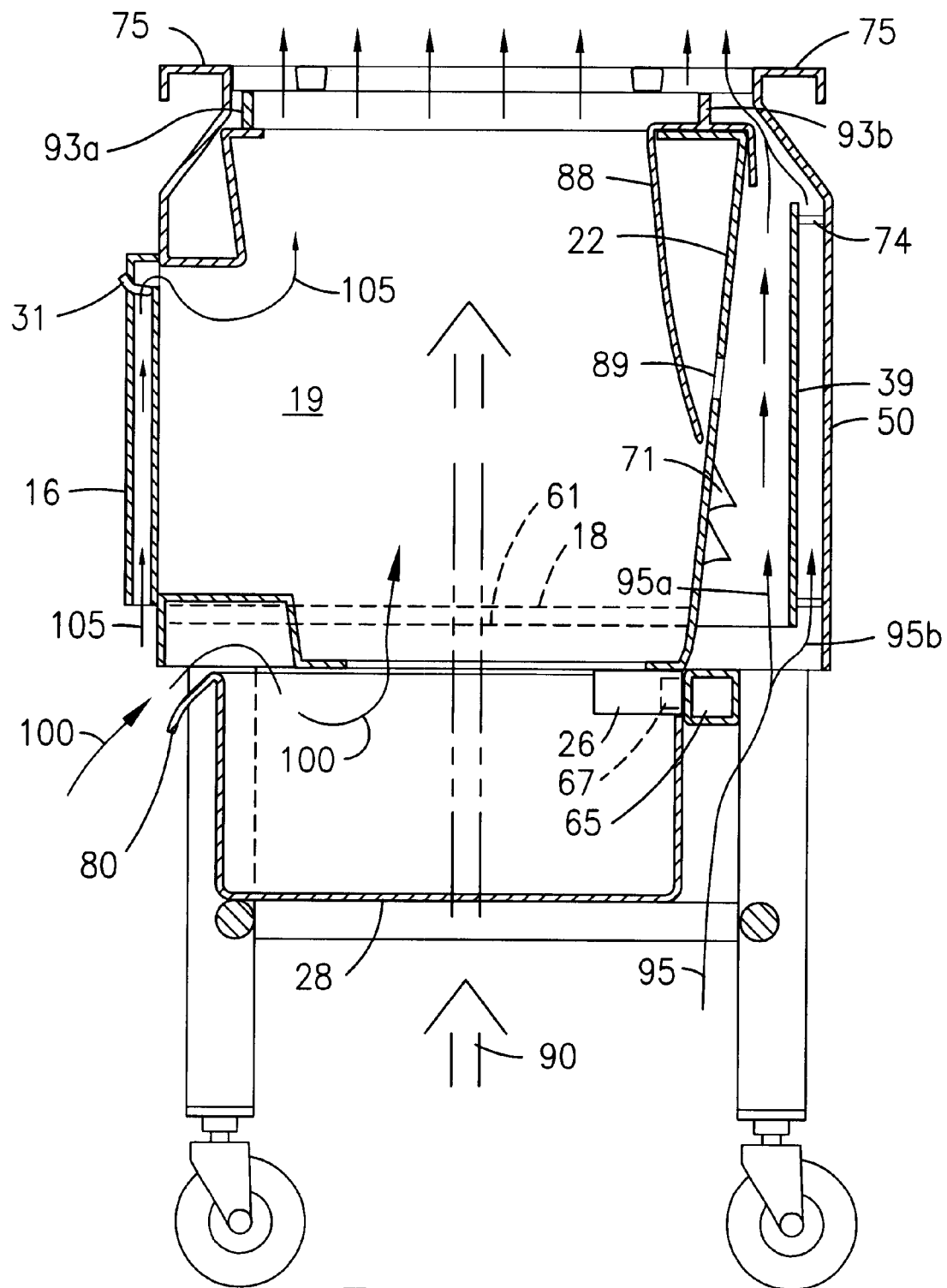
FIG. 7 is a sectional view of the grill illustrating the air inlets and the direction of air flow through the grill.

As disclosed in the isolation view of burner manifold 65 in FIG. 6, the burner manifold 65 has a body 66 with a plurality of gas jets 67. Each of the gas jets 67 rests inside a gas jet housing 26. As shown in FIG. 7 the body 66 is mounted near the back 50 of the grill 10 below the fuel support platform 18 with the gas jets 67 facing the front interior wall of the grill 11. The body 66 of the manifold 65 is welded to the support leg 32 using plug ends 68a and 68b to mount the weld 69 which consists of nut 70 and washer 72. The gas supply inlet 73, which supplies the entire manifold 65 with gas from gas source 60 shown in FIG. 3, is located at one end of the manifold 65. The placement of the manifold 65 allows the gas jets 67 to be positioned below the fuel support 18, clear of the retaining wall 22 such that flames from the jets 67 will enter the combustion chamber 19 and contact the fuel to be ignited.

Referring again to FIG. 2, the grill 10 includes outer housing 12 that substantially closes the grill 10 to form combustion chamber 19. Generally defining the combustion chamber 19 are the left side wall 33 and right side wall 35 and back wall 50 and inner retaining wall 22 which is encompassed by the outer housing 12. The inner retaining wall 22 and outer housing 12 form a double wall around the combustion chamber 19 creating an air space 21 where outside air may be drawn by convection action from openings located near the bottom of the grill 10. This prevents the outer housing 12 from overheating. In a preferred embodiment, a third wall 39, shown in FIG. 7 is located in the sides 33, 35 and back 50 of the grill 10, between the retaining wall 22 and the housing 12 providing additional insulation effect to the exterior of the housing 12.

The interior of the grill 10 is best seen in FIG. 7 illustrating the unique hollow-walled structure which allows the oven to heat and cool rapidly. The outer housing 12 and the third wall 39 are spaced by several "Z" plates 74. The "Z" plates 74 are used to connect the third wall 39 to the side walls 33 and 35 and the back wall 50. The front wall 11 does not contain "Z" plates 74 due to the presence of the front doors 16. Grill railing 75 extends from side 33, 35, back 50 and front walls 11, and is not attached to the inner retaining wall 22. This prevents the high temperatures reached in the combustion chamber 19 from transferring heat to the railing 75. Because cooks may accidentally touch the railing 75, minimizing the conductivity of heat from the combustion chamber 19 to the railing 75 improves the safety of the grill 10.

FIG. 7 illustrates the various air spacing and air conduits that allow outside air to enter the interior of the grill 10 to either fuel the fire or cool the exterior of the grill 10. Arrow 90 illustrates the primary air intake to feed air to the combustion chamber 19. The air enters between gaps in the collection trays 28 and moves around the gable 61 to the combustion chamber 19. Arrow 95 shows air entering from the open bottom of the grill 10. Air is directed around the manifold 65 and branches into arrows 95a and 95b. Arrow 95a shows air rising in between the retaining wall 22 and the third wall 39. Arrow 95b shows air entering the air space between the back wall 50 and the third wall 39. The cool air that runs on either side of the third wall serves as a buffer to prevent the exterior of the grill from becoming dangerously hot. Eventually arrows 95a and 95b merge and exit the grill 10 through the cooking surface 14 without ever entering the combustion chamber 19. A third air entry point is shown by arrow 100. Arrow 100 enters the grill 10 above the handle 80 of the collection tray 28. The arrow 100 eventually mixes with arrow 90 and enters the combustion chamber 19 to feed the fire. A fourth entry is represented by arrow 105 where air enters the open bottom of door 16. Arrow 105 eventually enters the combustion chamber 19. The air that enters the door 16 helps to keep the door 16 cool to the touch allowing the cook to open the door 16 to add fuel without fear of burning her hand on the door 16.

FIG. 7 also discloses angle stiffeners 71 which add stability to the retaining wall 22 of the grill 10. A typical grill 10 contains two stiffeners 71 placed adjacent and parallel to rear wall 50 and welded in place connecting the two side walls of the grill 10. The angle stiffeners 71 are necessary to add stability to the retaining wall 22 to prevent fuel that is cast into the combustion chamber 19 from pushing the retaining wall 22 back and potentially separating the retaining wall 22 from the spacers 93a and 93b. The welds of spacers 93a and 93b are responsible for holding the retaining wall 22 in position to define the combustion chamber 19. The welds at each end and spacers 93a and 93b connect the retaining wall 22 with the cooking surface 13. If the retaining wall 22 has force applied in a lateral direction, the spacers 93a and 93b are stressed and tend to break. The stiffeners 71 are in position to prevent the retaining wall 22 from moving laterally and also provide additional support to the wall to prevent fuel thrown into the combustion chamber 19 from piercing the retaining wall 22.

Figure 4:
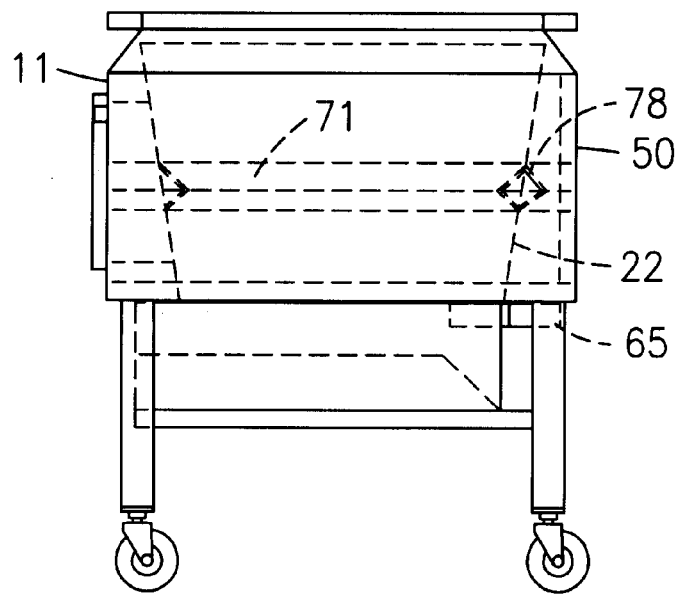
FIG. 4 is a side plan sectional view of the grill illustrating placement of an angle stiffener.

FIG. 4 illustrates an optional second position for the stiffener 71. The stiffener 71 is attached to the front wall 11 and the back wall 50 and supports the retaining wall 22. The rear portion of the stiffener 78 attaches above the burner manifold 65 to aid in supporting the additional weight of the manifold 65.

FIG. 7 also illustrates the relationship between the cooking surface 14, the fuel support platform 18, and the collection trays 28. Drippings from food placed on the cooking surface 14 pass the fuel support platform 18 and either deposit within the collection trays 28 or first hit a gable 61 before being deposited in the collection tray 28. Likewise, ash and debris, generated by the burning of the solid fuel, fall through the fuel support grate 17 and are deposited in the collection tray 28. After a cooking session, the fire may be extinguished, and the collection tray 28 removed by pulling upon handle 80. The contents of the collection tray 28 may be deposited in a waste receptacle and the collection tray 28 returned to its position. FIG. 7 also illustrates the position of the burner manifold 65 and jet housing 26 relative to the gable 61 and the fuel support platform 18. The jet housing 26 is located below the fuel support platform 18 in such a position that flames emanating from the jet housing 26 will come into contact with fuel placed on the support 18.

FIG. 7 also illustrates a deflecting plate 88 that hangs over the retaining wall 22. Typically, more than one deflecting plate 88 is used to cover the length of the retaining wall 22. Spaced about one-half inch apart, each Deflecting plate 88 should cover a hole 89 in the retaining wall 22 allowing air from arrow 95a to cool the interior of the retaining wall 22. The additional air flow contributes to the overall cooling effect that prevents the exterior of the grill 10 from reaching unsafe temperatures. In addition the air flow generated by the deflecting plate 88 shields the retaining wall 22 from extreme temperatures which result in repeated expansion and contraction of the retaining wall 22. Over time, if the retaining wall is not shielded properly the wall tends to buckle placing stress on the joints of the housing, which in turn compromises the structural integrity of the combustion chamber.

Referring now to FIG. 3, a gas cock 36 is disposed within or adjacent to the housing 12. The gas is supplied from gas source 60 and flows to gas cock 36. The gas cock 36 will be closed when the grill 10 is out of use, but will be open when the grill 10 is operational. The solenoid valve 38 is activated by a timer 42. The timer 42 may be set to keep the solenoid valve 38 open for a desired time. Opening the solenoid valve 38 and the gas cock 36 permits gas to flow through flex pipe 40 into the burner manifold 65 where flame is released from the gas jets. After the timer 42 expires and the solenoid valve 38 closes, the solid fuel should be well ignited. If the fuel is not ignited the timer 42 may be reset. An alternative embodiment of the invention may use a thermostat to detect when the combustion chamber 19 has achieved a sufficient temperature to sustain the burning of the fuel.

OPERATION

At the start of the cooking shift, solid fuel pieces such as hickory or mesquite logs are placed upon the fuel support surface 18. The logs are ignited by setting the ignition timer 42, the timer 42 may be set to varying lengths of time, depending on the type, condition, and quantity of fuel. The timer 42 once set opens the solenoid valve 38 which provides gas, from a gas source 60, through flex pipe 40 through the open gas cock 36 through more flex pipe 40, to burner manifold 65, to the plurality of gas jets 67 within gas jet housings 26. Gas may be manually or automatically ignited, and gas pressure and burner adjustments should be sufficient to throw flames beneath the fuel placed on the above fuel support platform 18. Gas flames will preferably extend at least about to the mid-point of the fuel support platform 18. After the timer 42 time has expired the solenoid valve 38 is closed automatically shutting off the gas source 60. Once the solid fuel pieces are ignited, air flow through the grill 10 is primarily upward from spaces between the collection trays 28. Because only the grates 13, 17 and retaining wall 22 must be heated, rather than a larger mass of fire bricks the present invention is able to achieve a stable cooking temperature in about twenty (20) minutes time. This is due to the unique double walled design of the grill, where the sides 33 and 35 and doors 16 are constructed with open bottoms and air spaces that permit the air to enter from the bottom and be vented into the upper portions of the combustion chamber 19. This forms a dynamic air barrier between the retaining wall 22 and the housing wall 8 and prevents the exterior of the housing 12 from overheating, without a sizable mass of fire brick.

At the end of a cooking shift the fire inside the combustion chamber 19 of grill 10 may be extinguished. Typically the cook will water down the fire. Unlike fire brick which may shatter if quenched with water the fire within steel retaining wall 22 may be quickly extinguished without consuming partially spent fuel. Once the fire is out, partially spent solid fuel may be removed to dry or left inside the combustion chamber for burning at the next cooking session. The gas jets 26 can provide sufficient heat to dry damp fuel at the beginning of a cooking session.

Although a preferred embodiment of the present invention has been disclosed in detail herein, it will be understood that various substitutions and modifications may be made to the disclosed embodiment described herein without departing from the scope and spirit of the present invention as recited in the appended claims.

What is claimed is:

1. A solid fuel cooking device comprising:
   a combustion chamber bounded by an open upper side and an open lower side and being substantially closed on four sides thereof by a retaining wall, whereby air for combustion flows into the chamber from the open lower side;
   a cooking surface covering the open upper side the combustion chamber;

a fuel support platform disposed within the open lower side below and substantially parallel to the cooking surface;

a housing spaced apart from and substantially enclosing an exterior of the retaining wall;

at least one angle stiffener supporting the retaining wall on at least one side of the combustion chamber;

an opening from an exterior of the housing through the retaining wall allowing access to the fuel support platform;

a door moveable to cover the opening; and an air space located between said housing and said retaining wall, said air apace having a width and extending vertically from a bottom upwards to a top and being substantially open at the top and at the bottom whereby in operation air flows in at the bottom of the air space and is heated through the retaining wall by combustion on the fuel support platform and flows upwards until the heated air is vented into the upper part of the combustion chamber above the fuel support platform and exits through the cooking surface.

2. The solid fuel cooking device of claim 1 comprising:

a plurality of gas jets supplied by an outside gas source and horizontally disposed within gas jet housing proximate a side retaining wall and below a the fuel support platform for injecting lit gas beneath solid fuel positioned upon the fuel support; whereby the gas jet housing shield the gas jets from debris falling from the cooking surface and the fuel support platform.

3. The device as set forth in claim 1 comprising a third wall disposed in the air space intermediate the sousing and retaining wall.

4. The device as set forth in claim 2 wherein gas supplied to the gas jets is timed to be shut-off from the outside gas source by a solenoid.

5. The device as set forth in claim 2 wherein gas supplied to the gas jets is regulated by a termostat.

6. The device as set forth in claim 1 wherein the has a double wall, and an open bottom and an open top to allow air to flow upward through the double wall of the door and into the combustion chamber.

7. The device as set forth in claim 1 comprising a railing attached to the exterior of the housing proximate the top of the air space.

8. The device as set forth in claim 3 having a "Z" plate between said housing and said third wall for defining the width of the air space therebetween.

9. The device as set forth in claim 1 having deflecting plate covering a portion of the retaining wall.

10. A solid fuel cooking device comprising:

a combustion chamber bounded by an open upper side and an open lower side and being substantially closed on four sides thereof by a retaining wall;

a cooking surface covering the open upper side thereof;

a fuel support platform disposed within the open lower side below and substantially parallel to the cooking surface whereby air for combustion of the fuel support platform enters the combustion chamber form the open lower side and exits the combustion chamber through openings in the cooking surface;

a plurality of gas horizontally disposed within gas jet housings proximate a side retaining wall and below the fuel support platform for lit gas beneath solid fuel positioned upon the fuel support whereby the gas jet housings shield the gas jets from debris falling from the cooking surface and the fuel support platform;

an opening below the cooking surface from an exterior of the housing to the fuel support platform; and a door moveable to cover the opening, said door having a double wall, and an open bottom and an open top to allow air to flow upward through the double wall of the door into the combustion chamber.

11. The device as set forth in claim 10 wherein the door is removable.

12. The device as set forth in claim 10 having at least one angle stiffener to support said retaining wall.

13. A solid fuel cooking device comprising;

a combustion chamber bounded by an open upper side and open lower side and being substantially closed on four sides thereof by a retaining wall, whereby air for combustion flow into combustion chamber from the open lower side;

a cooking surface covering the open upper side of the combustion chamber, said cooking surface having openings to allow the exit of air from the combustion chamber;

a fuel support platform disposed within the open lower side beneath and substantially parallel to the cooking surface;

a plurality of gas jets horizontally disposed within gas jet housing proximate a side retaining wall and below the fuel support platform for injecting lit gas from an outside gas source beneath solid fuel positioned upon the fuel support whereby the gas jet housing shield the gas jets from debris falling from the cooking surface and the fuel support platform, the device further having at least two removable collection trays below the fuel support platform, there being a gap defined between said trays to allow air to flow upward from the open lower side to the fuel support platform; and a gable beneath the fuel support platform and directly above the gap defined between the removable collection trays for directing ash and drippings into said collection trays.

14. The device as set forth in claim 13 wherein gas supplied to the gas jet is timed to be shut-off from the outside gas source by a solenoid.

15. The device as set forth in claim 13 wherein the gas jets are disposed the rear side retaining wall.

16. The device as set forth in claim 13 wherein the interior of said retaining wall is covered by a deflecting plate.

17. The device as set forth in claim 13 having a removable double-wall doors for accessing the combustion chamber said door having an open bottom and an open top to allow air to flow upward through the double wall of the door and into the combustion chamber.

18. The device as set forth in claim 13 having at least one angle stiffener to support said retaining wall.

* * * * *